United States Patent [19]
Meier et al.

[11] Patent Number: 5,194,467
[45] Date of Patent: Mar. 16, 1993

[54] STABILIZATION OF HIGHLY HEAT DISTORTION RESISTANT POLYCARBONATES

[75] Inventors: Helmut-Martin Meier, Ratingen; Uwe Westeppe, Mettmann; Rolf Dhein; Dieter Freitag, both of Krefeld; Martin Wandel, Dormagen; Axel Sandquist, Monheim, all of Fed. Rep. of Germany

[73] Assignee: Bayer Aktiengesellschaft, Leverkusen, Fed. Rep. of Germany

[21] Appl. No.: 816,918

[22] Filed: Jan. 3, 1992

Related U.S. Application Data

[63] Continuation of Ser. No. 642,489, Jan. 17, 1991, abandoned.

[51] Int. Cl.$^5$ .................................................. C08K 5/06
[52] U.S. Cl. ..................................... 524/107; 524/109
[58] Field of Search ................................. 524/107, 109

[56] References Cited

U.S. PATENT DOCUMENTS

| | | | |
|---|---|---|---|
| 4,342,681 | 8/1982 | Idel et al. | 524/108 |
| 4,375,525 | 3/1983 | Idel et al. | 524/108 |
| 4,982,014 | 1/1991 | Freitag et al. | 568/721 |

FOREIGN PATENT DOCUMENTS 0096818 10/1985 European Pat. Off.
3832396 2/1990 Fed. Rep. of Germany.

*Primary Examiner*—Kriellion S. Morgan
*Attorney, Agent, or Firm*—Joseph C. Gil; Richard E. L. Henderson

[57] ABSTRACT

Highly heat distortion resistant moulding compositions are disclosed comprising an aromatic polycarbonate having molecular weights Mw (weight average) of a least 10,000, containing bifunctional carbonate structural units corresponding to formula (Ia)

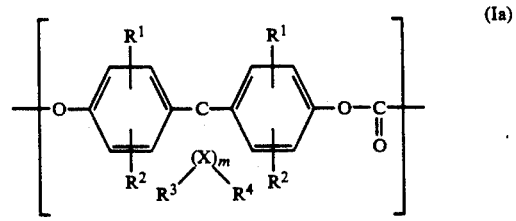

wherein
$R^1$ and $R^2$ denote, independently of one another, hydrogen, halogen, $C_1$-$C_8$-alkyl, $C_5$-$C_6$-cycloalkyl, $C_6$-$C_{10}$-aryl or $C_7$-$C_{12}$-aralkyl,
m stands for an integer from 4 to 7,
$R^3$ and $R^4$, which are selected individually for each X, denote, independently of one another, hydrogen or $C_1$-$C_6$-alkyl, and
X denotes carbon under the condition that $R^3$ and $R^4$ are both alkyl on at least one X atom and
as the only thermo stabilizer, from 0.001 to 1% by weight of a siloxane corresponding to formula (II)

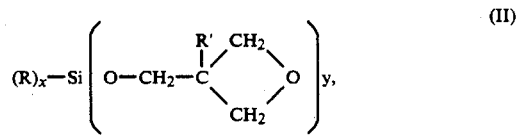

wherein
R and R' denote, independently of one another, $C_1$-$C_4$-alkyl or -aryl and
x and y stand for the numbers 1,2 or 3 and x+y always add up to 4.

4 Claims, No Drawings

STABILIZATION OF HIGHLY HEAT DISTORTION RESISTANT POLYCARBONATES

This application is a continuation of application Ser. No. 07/642,489 filed Jan. 17, 1991 now abandoned.

German Offenlegungsschrift 38 32 396 relates inter alia to highly heat disortion resistant aromatic polycarbonates having molecular weights Mw (weight average) of at least 10,000, preferably from 10,000 to 200,000, in particular from 20,000 to 80,000 and containing bifunctional carbonate structural units corresponding to formula (Ia)

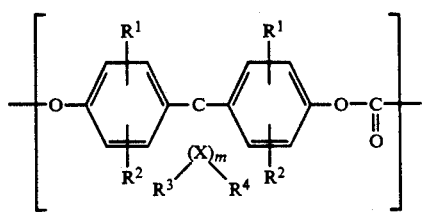

in quantities of from 100 to 2 mol-%, preferably from 100 to 5 mol-%, in particular from 100 to 10 mol-% and most preferably from 100 to 20 mol-%, based in each case on the total 100 mol-% of difunctional carbonate structural units.

In the above formula (Ia), $R^1$ and $R^2$ denote, independently of one another, hydrogen, halogen, preferably chlorine or bromine, $C_1$–$C_8$-alkyl, $C_5$–$C_6$-cycloalkyl, $C_6$–$C_{10}$-aryl, preferably phenyl, or $C_7$–$C_{12}$-aralkyl, preferably phenyl-$C_1$–$C_4$-alkyl, in particular benzyl, m denotes an integer with a value from 4 to 7, preferably 4 or 5, $R^3$ and $R^4$, which are selected individually for each X, denote, independently of one another, hydrogen or C–$C_6$-alkyl, and X denotes carbon
under the condition that $R^3$ and $R^4$ are both alkyl on at least one X atom.

$R^3$ and $R^4$ are preferably both alkyl on one or two X atoms, in particularly on only one X atom. The preferred alkyl group is methyl. The X atoms in the α-position to the diphenyl-substituted carbon atom (C-1) are preferably not dialkyl-substituted but alkyl disubstitution is preferred in the β-position to C-1. The structural units corresponding to formula (Ia) may in particular be the residues of dihydroxy-diphenylcycloalkanes having 5 or 6 ring carbon atoms in the cycloaliphatic group, such as those corresponding to the following formulae:

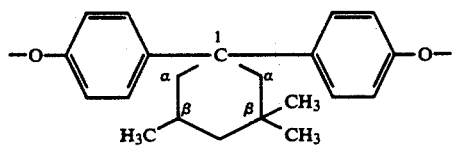

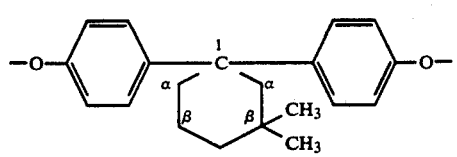

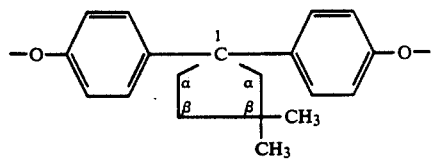

These polycarbonates thus contain other difunctional carbonate structural units in quantities to make up the complete 100 mol-%, for example, structural units corresponding to the formula (VIIa)

wherein

Z stands for an aromatic group having 6–30 carbon atoms.

These other difunctional carbonate structural units are thus present in the polycarbonate in quantities from and including 0 mol-% to and including 98 mol-%, preferably from 0 mol-% to 95 mol-%, in particular from 0 mol-% to 90 mol-%, most preferably from 0 mol-% to 80 mol-%, based in each case on the total quantity of 100 mol-% of difunctional carbonate structural units.

Those polycarbonates in which the structural units of formula (Ia) are units corresponding to the following formula (Ic) are preferred:

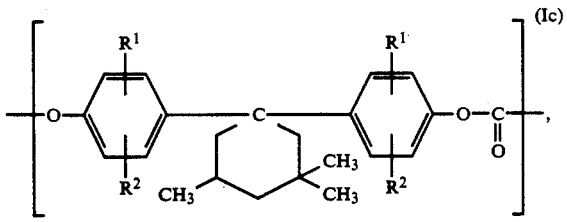

wherein $R^1$ and $R^2$ have the meanings indicated for formula (Ia), most preferably hydrogen.

It was found that good long-term stabilization against thermal degradation could be imparted to the polycarbonates according to German Offenlegungsschrift 38 32 396 by means of silicon compounds containing oxetanyl groups as the only thermo stabilizer.

This invention thus relates to highly heat distortion resistant aromatic polycarbonates having molecular weights Mw (weight average) of at least 10,000, preferably from 10,000 to 200,000, in particular from 20,000 to 80,000, containing bifunctional carbonate structural units corresponding to formula (Ia)

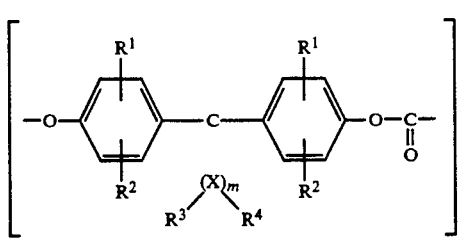

(Ia)

wherein $R^1$ and $R^2$ denote, independently of one another, hydrogen, halogen, $C_1$-$C_8$-alkyl, $C_5$-$C_6$-cycloalkyl, $C_6$-$C_{10}$-aryl or $C_7$-$C_{12}$-aralkyl, m stands for an integer with a value from 4 to 7, $R^3$ and $R^4$, which may be chosen individually for each X, denote, independently of one another, hydrogen or $C_1$-$C_6$-alkyl and X denotes carbon under the condition that $R^3$ and $R^4$ both denote alkyl on at least one X atom, which polycarbonates contain, as the only thermo stabilizer, from 0.001 to 1% by weight, preferably from 0.01 to 0.5% by weight, of a siloxane corresponding to formula (II)

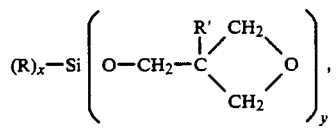

(II)

wherein

R and R' denote, independently of one another, $C_1$-$C_4$-alkyl or aryl (phenyl) and x and y stand for the numbers 1, 2 or 3 and x+y always adds up to 4.

The following are examples of suitable siloxanes corresponding to formula (II):

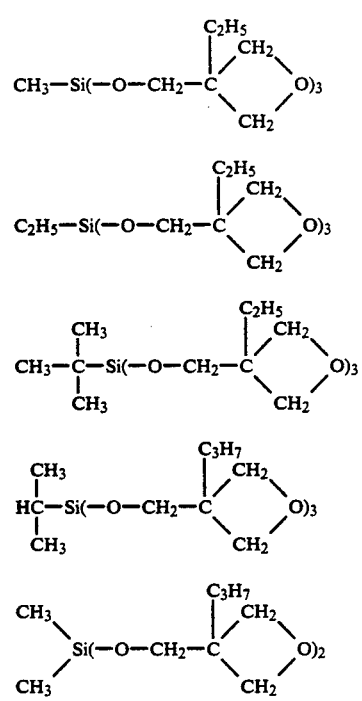

(II,1)

(II,2)

(II,3)

(II,4)

(II,5)

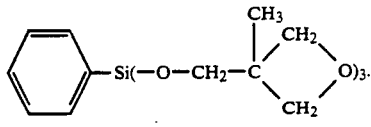

(II,6)

Siloxanes corresponding to formulae (II) are known or may be prepared by known processes, for example by the reaction of silicon halides corresponding to formula (IV)

$R_xSi(Hal)_y$     (IV)

wherein

R, x and y have the meanings indicated for the siloxanes of formula (II) and Hal stands for halogen, e.g. chlorine, with oxetane alcohols corresponding to formula (V)

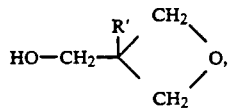

(V)

wherein

R' has the meaning indicated for the siloxanes of formula (II)

in the presence of acid-binding agents, for example triethylamine, N,N-dimethylaniline or sodium acetate, and of solvents such as ligroin, toluene, tetrahydrofuran or diethylether.

EXAMPLES

A copolycarbonate based on 1,1-bis-(4-hydroxyphenyl)-3,3,5-trimethylcyclohexane and 2,2-bis-(4-hydroxyphenyl)propane in a molar ratio of 35:65 and having a relative solution viscosity of 1.295 (determined in methylene chloride at 25° C. and at a concentration of 0.5 g/100 ml) was investigated.

EXPERIMENT ACCORDING TO THE INVENTION

A: The copolycarbonate mentioned above contained, as long term thermo-stabilizer, 0.1% by weight of methyl-tris-(3-ethyloxetanyl-3-methoxy)-silane(II,1).

COMPARISONS

B: The copolycarbonate contained no stabilizer.

C: The copolycarbonate was re-extruded once. This ensured that the same process steps were carried out as in A but without the presence of a long term thermostabilizer.

AGEING TESTS

The small standard rods of polycarbonate of Experiments A, B and C were subjected to hot air ageing at 150° C. The transmission (FIG. 1) was determined according to DIN 5033 (ASTM 1003) or DIN 4646 (in %), the Yellowness Index (FIG. 2) according to ASTM D 1925 (dimensionless) and the cloudiness (FIG. 3) according to DIN 5036 (ASTM 1003) (in %).

What is claimed is:

1. A thermoplastic molding composition characterized by its high heat distortion resistance comprising
   (i) an aromatic polycarbonate resin having a weight average molecular weight of at least 10,000, containing bifunctional carbonate structural units corresponding to formula (Ia)

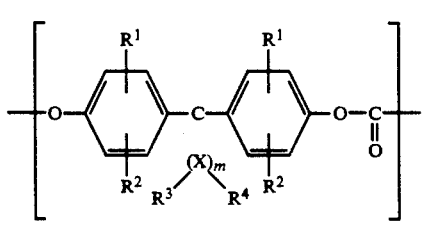

wherein
- $R^1$ and $R^2$ denote, independently of one another a member selected from the group consisting of hydrogen, halogen, $C_1$–$C_8$-alkyl, $C_5$–$C_6$-cycloalkyl, $C_6$–$C_{10}$-aryl and $C_7$–$C_{12}$-aralkyl,
- m is an integer from 4 to 7,
- $R^3$ and $R^4$, which are selected individually for each X, denote independently of one another, hydrogen or $C_1$–$C_6$-alkyl, and
- X denotes carbon, under the condition that $R^3$ and $R^4$ are both alkyl on at least one X atom, and (ii) as the only thermo stabilizer about 0,001 to 1% by weight of a siloxane corresponding to formula (II)

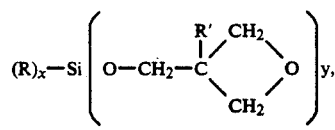

wherein
- R and R' denote, independently of one another $C_1$–$C_4$-alkyl or aryl and
- x and y denote the numbers 1, 2 or 3 and the sum x+y is 4.

2. The composition of claim 1 wherein said molecular weight is about 10,000 to 200,000.

3. The composition of claim 1 where said molecular weight is about 20,000 to 80,000.

4. The composition of claim 1 wherein said resin further contains difunctional units corresponding to

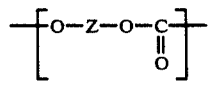

wherein Z is an aromatic radical having 6 to 30 carbon atoms.

* * * * *

UNITED STATES PATENT AND TRADEMARK OFFICE
CERTIFICATE OF CORRECTION

PATENT NO. : 5,194,467

DATED : March 16, 1993

INVENTOR(S) : Helmut-Martin Meier et al

It is certified that error appears in the above-identified patent and that said Letters Patent is hereby corrected as shown below:

IN THE ABSTRACT:

At lines 3 and 4, after "Mw (weight average)", delete "of a least 10,000" and insert --of at least 10,000-- therefor.

At formula (Ia), delete the formula and insert the following therefor:

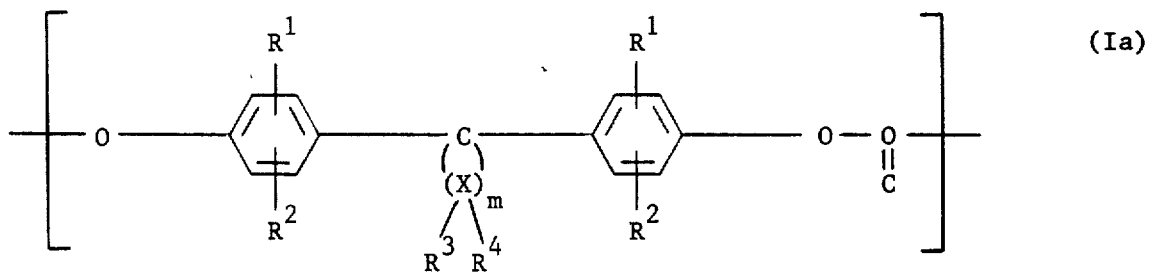

At column 1, line 20, delete formula (Ia) and insert the following therefor:

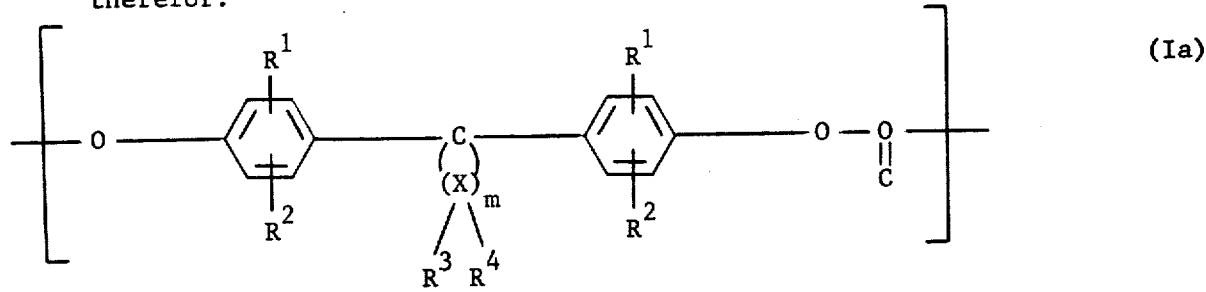

UNITED STATES PATENT AND TRADEMARK OFFICE
CERTIFICATE OF CORRECTION

PATENT NO. : 5,194,467
DATED : March 16, 1993
INVENTOR(S) : Helmut-Martin Meier et al It is certified that error appears in the above-identified patent and that said Letters Patent is hereby corrected as shown below:

At column 2, line 5, delete the formula and insert the following therefor:

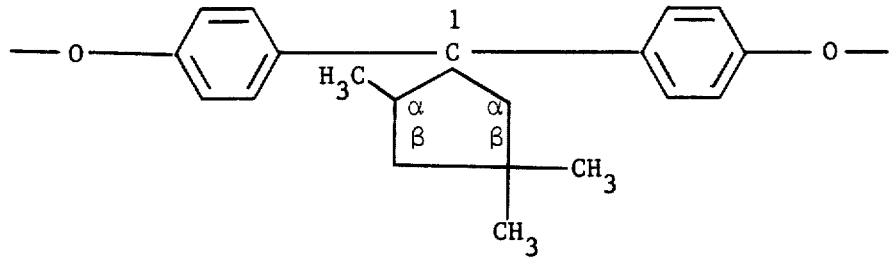

At column 3, line 5, delete the formula and insert the following therefor:

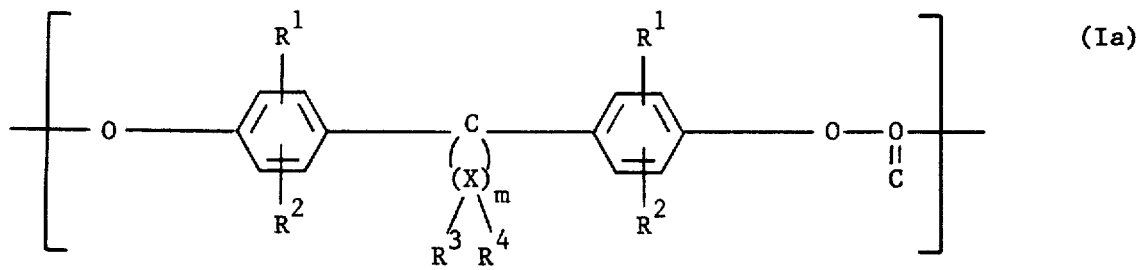

At column 4, line 13, before "$R_xSi(Hal)_y$", delete "ti".

UNITED STATES PATENT AND TRADEMARK OFFICE
CERTIFICATE OF CORRECTION

PATENT NO. : 5,194,467

DATED : March 16, 1993

INVENTOR(S) : Helmut-Martin Meier et al

It is certified that error appears in the above-identified patent and that said Letters Patent is hereby corrected as shown below:

In Claim 1, at column 5, line 10, delete formula (Ia) and insert the following therefor:

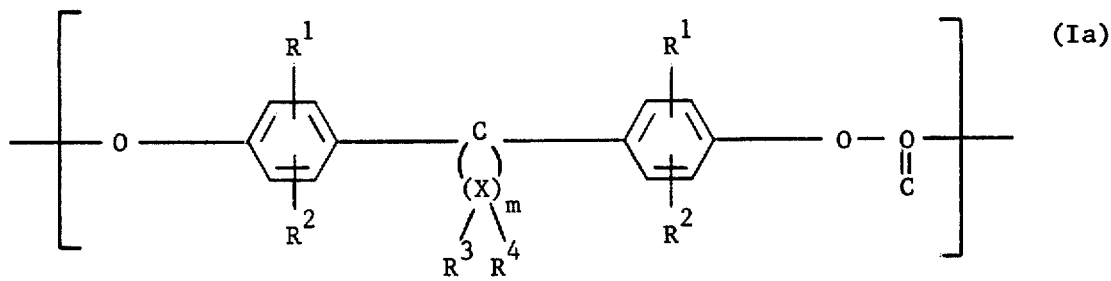

Signed and Sealed this

Twenty-fifth Day of January, 1994

Attest:

BRUCE LEHMAN

Attesting Officer   Commissioner of Patents and Trademarks